(12) United States Patent
Deshpande et al.

(10) Patent No.: US 10,042,911 B2
(45) Date of Patent: Aug. 7, 2018

(54) DISCOVERY OF RELATED ENTITIES IN A MASTER DATA MANAGEMENT SYSTEM

(71) Applicant: International Business Machines Corporation, Armonk, NY (US)

(72) Inventors: Prasad M. Deshpande, Bangalore (IN); Salil R. Joshi, Bangalore (IN); Mukesh Kumar Mohania, New Delhi (IN); Karin Murthy, Manchester, NH (US); Scott Schumacher, Porter Ranch, CA (US); Bruhathi H. Sundarmurthy, Bangalore (IN)

(73) Assignee: International Business Machines Corporations, Armonk, NY (US)

(*) Notice: Subject to any disclaimer, the term of this patent is extended or adjusted under 35 U.S.C. 154(b) by 1341 days.

(21) Appl. No.: 13/954,155

(22) Filed: Jul. 30, 2013

(65) Prior Publication Data
US 2015/0039611 A1    Feb. 5, 2015

(51) Int. Cl.
*G06F 17/30*    (2006.01)

(52) U.S. Cl.
CPC .............................. *G06F 17/30598* (2013.01)

(58) Field of Classification Search
CPC .................................................. G06F 17/30598
See application file for complete search history.

(56) References Cited

U.S. PATENT DOCUMENTS

| | | | |
|---|---|---|---|
| 7,917,462 B1 * | 3/2011 | Shatdal | G06F 17/30592 707/600 |
| 8,370,355 B2 | 2/2013 | Harger et al. | |
| 8,392,460 B2 | 3/2013 | Hoang et al. | |
| 8,510,338 B2 * | 8/2013 | Cushman, II | G06F 17/30303 706/46 |
| 2004/0172393 A1 * | 9/2004 | Kazi | G06F 17/30616 |
| 2005/0149539 A1 | 7/2005 | Cameron et al. | |
| 2005/0262128 A1 | 11/2005 | Goodwin et al. | |
| 2006/0053151 A1 | 3/2006 | Gardner et al. | |

(Continued)

OTHER PUBLICATIONS

Boyce, Sinead. et al., "Developing Domain Ontologies for Course Content," Journal of Educational Technology & Society, 2007, pp. 275-288, vol. 10, No. 3, International Forum of Educational Technology & Society, IEEE Digital Library.

(Continued)

*Primary Examiner* — Alicia Willoughby
(74) *Attorney, Agent, or Firm* — Ference & Associates LLC

(57) ABSTRACT

Methods and arrangements for discovering entity types for a set of records. A set of records is input, with each record comprising attributes with associated attribute values. The records are grouped into candidate entity types in view of at least one of: the attribute values of the records, at least one domain ontology and at least one dimension hierarchy. An interestingness measure of each candidate entity type is calculated, via estimating interestingness based on at least one factor selected from the group consisting of: a correlation between attribute values of records, a number of attributes, a log of queries issued to a server, and an average group size for candidate entity types. At least one candidate entity type is validated based on the calculated interestingness measures. Other variants and embodiments are broadly contemplated herein.

20 Claims, 9 Drawing Sheets

(56) References Cited

U.S. PATENT DOCUMENTS

| | | |
|---|---|---|
| 2007/0214179 A1 | 9/2007 | Hoang |
| 2008/0104103 A1* | 5/2008 | Adams |
| 2009/0089317 A1* | 4/2009 | Ford ................ G06F 17/30598 |
| 2009/0319515 A1* | 12/2009 | Minton ............ G06F 17/30303 |
| 2010/0161603 A1* | 6/2010 | Caceres ........... G06F 17/30539 |
| | | 707/736 |
| 2010/0205198 A1* | 8/2010 | Mishne ............ G06F 17/30687 |
| | | 707/759 |
| 2013/0035961 A1* | 2/2013 | Yegnanarayanan ... G06F 19/322 |
| | | 705/3 |
| 2014/0032556 A1* | 1/2014 | Bayliss ............ G06F 17/30303 |
| | | 707/737 |
| 2014/0156606 A1* | 6/2014 | Beskales ........... G06F 17/30303 |
| | | 707/692 |
| 2014/0279757 A1* | 9/2014 | Shimanovsky .... G06Q 30/0282 |
| | | 706/12 |

OTHER PUBLICATIONS

Ma, Li et al., "Semantic Enhancement for Enterprise Data Management," 2009, pp. 863-878. Available at http://data.semanticweb.org/pdfs/iswc/2009/in-use/paper157.pdf accessed Jul. 23, 2013.

Benjelloun, Omar et al., "Swoosh: a generic approach to entity resolution," The VLDB Journal, 2008, 22 Pages, Springer-Verlag, New York, New York, USA.

* cited by examiner

|    | First Name | Last Name | Address  | Home Phone | Email              | Age |
|----|-----------|-----------|----------|------------|--------------------|-----|
| m1 | John      | Smith     | San Jose | 4444       | js@ email.example  | 40  |
| m2 | J         | Smith     | San Jose | 4444       |                    |     |
| m3 | Jane      | Smith     | San Jose | 4444       | jane@ email.example | 37  |
| m4 | Jane      | Maiden    |          |            | jane@ email.example | 37  |

FIG. 2

|    | First Name | Last Name | Home Phone | Email | Age | Language | Location |
|----|-----------|-----------|------------|-------|-----|----------|----------|
| m1 | John | Smith | 4444 | js@ email.example | 40 | English | London |
| m2 | J | Smith |  | jsmith@ email.example |  | English | London |
| m3 | Jane | Smith | 4444 | jane@ email.example | 37 | English | London |
| m4 | Jane | S | 4444 |  | 37 | English | London |
| m5 | Rita | G | 5678 |  | 24 | Spanish | Venice |
| m6 | R | Gonazales |  | rg@ email2.example | 24 | Spanish | Venice |
| m7 | Rodriguez | Gonzalez | 8930 | rodrig@ email2.example | 47 | French | Venice |
| m8 | Romina | Gonzalez | 8930 | rodrig@ email2.example | 24 | French, Spanish | Venice |

FIG. 6

DISCOVERY OF RELATED ENTITIES IN A MASTER DATA MANAGEMENT SYSTEM

BACKGROUND

Generally, in MDM (master data management) today, member records are linked into entities based on their similarity scores computed from a set of attributes. In many real world applications, a single notion of an entity may not be sufficient.

Generally, the notion of an "entity" varies and depends on the business problem at hand. For example, a "Person" entity may be suitable for some applications, whereas a "Household" entity may be more suitable for other applications. Even if multiple entity types are explicitly specified, current MDM systems do not have a way of finding relationships between these entities, if they exist.

Conventional MDM systems can link each record into a single entity. They cannot support the notion of linking a record into multiple related entity types, so that the same record can be viewed in multiple ways.

BRIEF SUMMARY

In summary, one aspect of the invention provides a method of discovering entity types for a set of records, said method comprising: inputting a set of records, each record comprising attributes with associated attribute values; grouping the records into candidate entity types in view of at least one of: the attribute values of the records, at least one domain ontology and at least one dimension hierarchy; calculating an interestingness measure of each candidate entity type, via estimating interestingness based on at least one factor selected from the group consisting of: a correlation between attribute values of records, a number of attributes, a log of queries issued to a server, and an average group size for candidate entity types; and validating at least one candidate entity type based on the calculated interestingness measures.

Another aspect of the invention provides an apparatus for discovering entity types for a set of records, said apparatus comprising: at least one processor, and a computer readable storage medium having computer readable program code embodied therewith and executable by the at least one processor, the computer readable program code comprising: computer readable program code configured to input a set of records, each record comprising attributes with associated attribute values; computer readable program code configured to group the records into candidate entity types in view of at least one of: the attribute values of the records, at least one domain ontology and at least one dimension hierarchy; computer readable program code configured to calculate an interestingness measure of each candidate entity type, via estimating interestingness based on at least one factor selected from the group consisting of: a correlation between attribute values of records, a number of attributes, a log of queries issued to a server, and an average group size for candidate entity types; and computer readable program code configured to validate at least one candidate entity type based on the calculated interestingness measures.

An additional aspect of the invention provides a computer program product for discovering entity types for a set of records, said computer program product comprising: a computer readable storage medium having computer readable program code embodied therewith, the computer readable program code comprising: computer readable program code configured to input a set of records, each record comprising attributes with associated attribute values; computer readable program code configured to group the records into candidate entity types in view of at least one of: the attribute values of the records, at least one domain ontology and at least one dimension hierarchy; computer readable program code configured to calculate an interestingness measure of each candidate entity type, via estimating interestingness based on at least one factor selected from the group consisting of: a correlation between attribute values of records, a number of attributes, a log of queries issued to a server, and an average group size for candidate entity types; and computer readable program code configured to validate at least one candidate entity type based on the calculated interestingness measures.

A further aspect of the invention provides a method comprising: obtaining a set of records; and semi-automatically discovering entity types relative to the set of records via: obtaining attributes, domain ontologies and dimension hierarchies with respect to the records; estimating a quantitative interestingness score of candidate entity types based on correlations between attributes, a number of attributes and entity group sizes; and assisting a user in validating candidate entity types and creating new candidate entity types via presenting the candidate entity types in an order of relevance along with corresponding interestingness scores and sample entities of each of the candidate entity types.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 2 provides a sample set of member records.

FIG. 6 provides a sample database.

DETAILED DESCRIPTION

Figure 1:
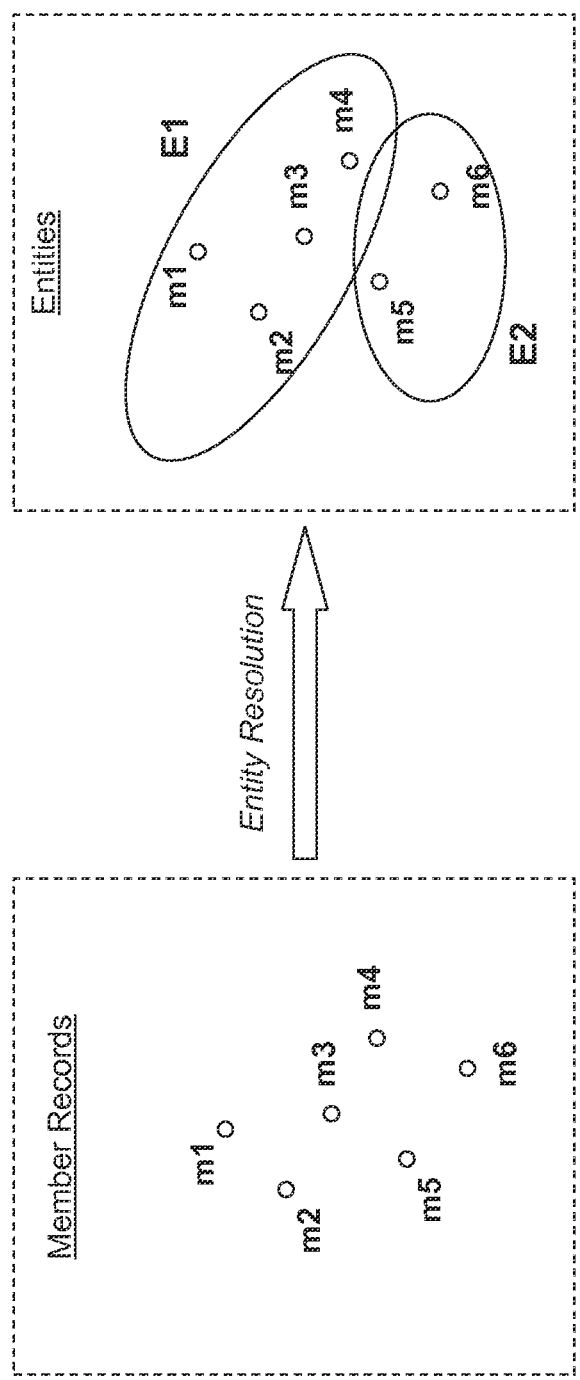
FIG. 1 schematically illustrates conventional entity resolution.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-8. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 9. In accordance with an example embodiment, most if not all of the process steps, components and outputs discussed with respect to FIGS. 1-8 can be performed or utilized by way of a processing unit or units and system memory such as those indicated, respectively, at 16' and 28' in FIG. 9, whether on a server computer, a client computer, a node computer in a distributed network, or any combination thereof.

Broadly contemplated herein, in accordance with at least one embodiment of the invention, is a system that allows automatic discovery of important entity types from the MDM member records. The entities will be linked together into a hierarchy, with larger entities comprising smaller sub-entities.

Conventionally, as shown in FIG. 1, an entity is represented by a collection of member records. Normally, member records are grouped together into entities based on their pair-wise similarity scores. A member record can belong to only one entity of a specific type, while same member record can belong to multiple entities of different types (e.g., a member record may belong to a person entity as well as a household entity). Generally, the discovery of multiple entity types is done manually and, even when manually discovered, entity resolution for different entity types is done independently, without any interaction or consideration across entity types. For example, in MDM each entity has its own set of comparison functions that decide whether two member records match, and should be merged into the same entity.

In continuing to consider the shortcomings of conventional arrangements, consider the set of member records in FIG. 2. The matching algorithm for "Person" may take into account all attributes shown in the records and decide that there are three entities: John {m1} and Jane {m3, m4} and J {m2}. Alternatively, it may arbitrarily assign m2 to either John or Jane, but conventionally m2 cannot be assigned to both. The matching algorithm for "Household" may take into account "Last Name" and "Address" and therefore create two entities Smith {m1, m2, m3} and Maiden {m4}. However, the algorithm will not include m4 in the Smith entity as either a "Last Name" or "Address" match, despite the fact that for the "Person" entity it has already been established that m3 and m4 refer to the same person.

In accordance with at least one embodiment of the invention, several advantageous features are attained. Generally, there are supported multiple notions of entities that are related; for example, "Person" and "Household". There is supported an automatic discovery of meaningful entity types. There is provided a way to link entities into bigger entities. For example, "COMPANY Bangalore" and "COMPANY Delhi" can be grouped into a "COMPANY India" entity; at the same time, "COMPANY India" and "COMPANY US" can be further grouped into a "COMPANY" entity.

In accordance with at least one embodiment of the invention, there is provided a framework to maintain relationships between entities of same (or similar) and different types. For example, "COMPANY Bangalore" is a sub-entity of "COMPANY India". "COMPANY Bangalore" and "COMPANY Delhi" are related entities, etc. Entity resolution for an entity type is improved by taking into account relationships with other entity types. For example, if a member record belongs to COMPANY Bangalore, it should belong to all its parent entities. For example, if a member record belongs to the same "Person" entity, it should also belong to the same "Household" entity if the address matches.

Figure 3:
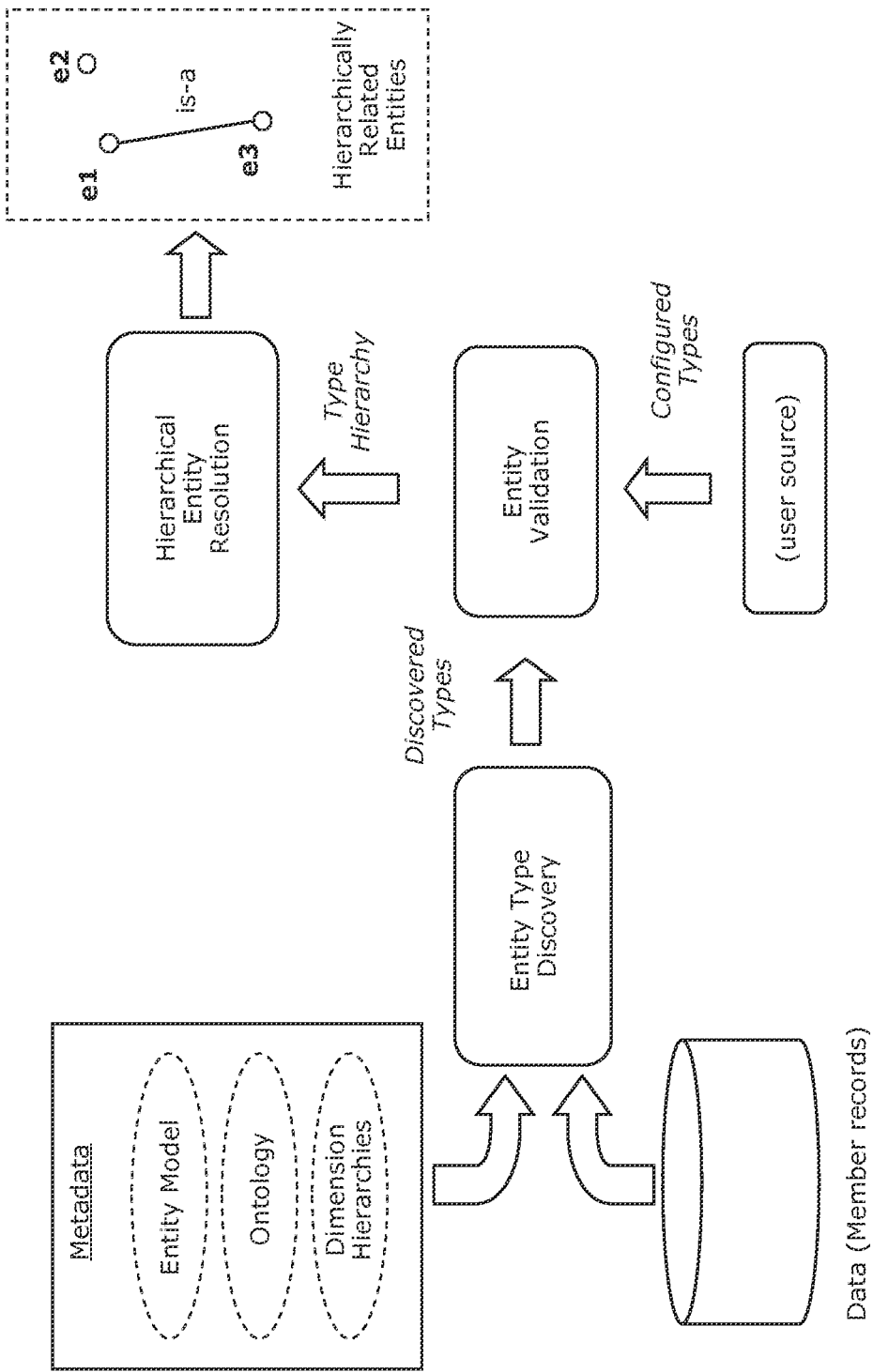
FIG. 3 provides a system overview.

FIG. 3 provides a system overview, in accordance with at least one embodiment of the invention. As shown, data in the form of member records are fed to an engine for entity type discovery, which utilizes metadata (an entity model, ontology and dimension hierarchies) to discover and establish entity types. Discovered types are then validated against preconfigured entity types, and a type hierarchy is formed. A hierarchical entity resolution engine outputs a map or overview of hierarchically related entities.

Figure 4:
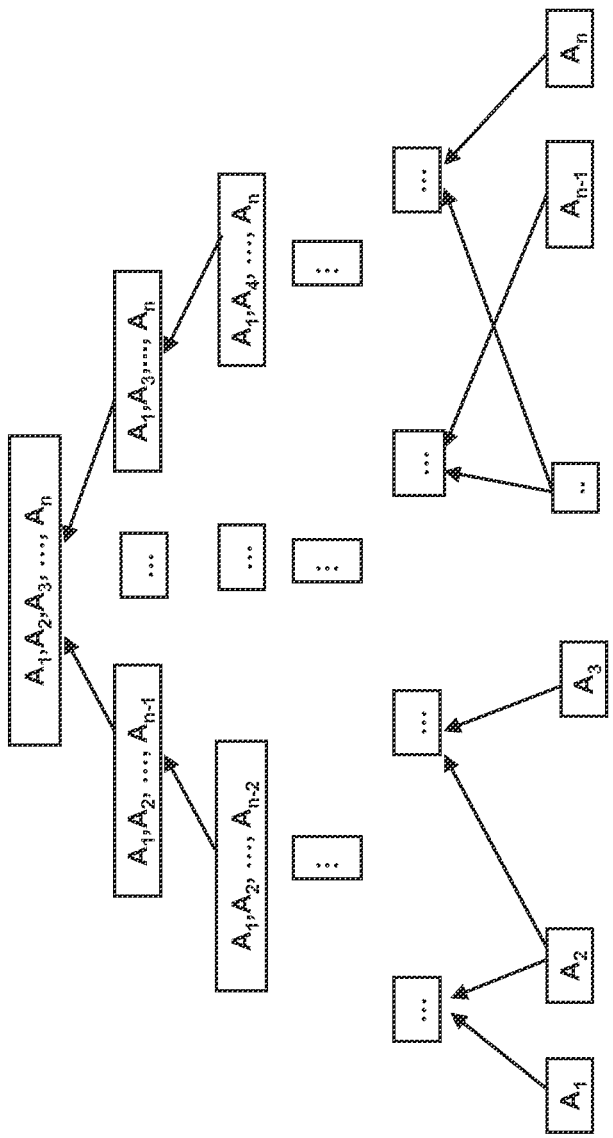
FIG. 4 provides a graphical representation of discovering hierarchically related entities.
Figure 5:
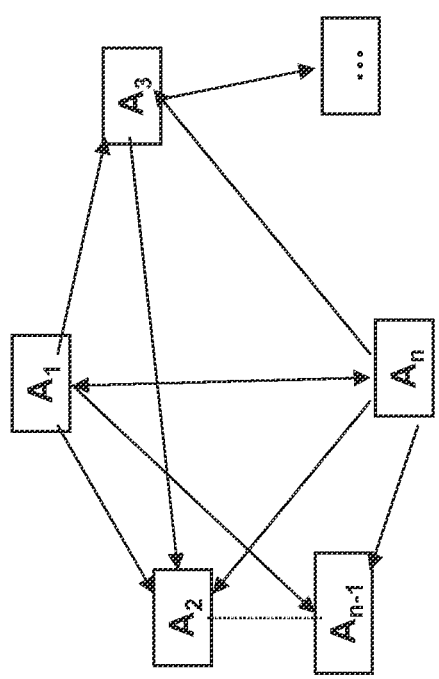
FIG. 5 illustrates an attribute relation graph.

FIG. 4 provides a graphical representation of discovering hierarchically related entities, in accordance with at least one embodiment of the invention. Here, it can be appreciated that every possible entity type can be viewed as part of a lattice. To construct a lattice, there is constructed a lattice space of all possible attribute combinations as shown in FIG. 4. Each node represents the set of clusters formed based on the values of the attributes of the entity type in question.

In accordance with at least one embodiment of the invention, in entity discovery, different types of entities are obtained depending on the attributes with which records are compared. For example, consider member records with the attributes: <First Name, Last Name, Home Phone, Email, Age, Language, Location>. The person entity corresponds to the attribute set <First Name, Last Name, Home Phone, Email, Age, Language, Location>, since all the attributes are used to define a person. The household entity corresponds to the attribute set <Last Name, Home Phone, Language, Location>, since people in a household will have these attributes similar, but will have different first names, email addresses and phone numbers.

In accordance with at least one embodiment of the invention, it is recognized that not all sets of attributes will lead to meaningful entities. For example, <First Name, Location> might not be very useful, since it will consider members with the same first name in a location as an entity. Automatically identifying sets of attributes that lead to meaningful entities is difficult, as it depends on the domain specific semantics. Herein, entity types are discovered semi-automatically based on a combination of interestingness measure and manual input.

In accordance with at least one embodiment of the invention, the interestingness of a set of attributes is a combination of several factors. One factor is a measure of the correlation between the attributes. Particularly, it can be observed that when a set of attributes is "interesting" as an entity, the attributes are typically correlated to each other. For example, in the set <Last Name, Home Phone, Language, Location>, the attributes are likely to be correlated, since one can expect to see multiple people with the same last name to have the same phone number, language, and location. The correlation score between any two attributes can be quantified to be a value between one and zero.

In accordance with at least one embodiment of the invention, functional dependency is used as a measure to capture the above-noted correlations. Particularly, functional dependency between a pair of attributes A and B is calculated as:

$$FD(A,B)=|A|/|(A,B)|,$$

where $|A|$ is the number of distinct values for attribute A. A correlation is found using:

$$CORR(A,B)=MAX(FD(A,B),FD(B,A)).$$

The correlation values of all combinations of attributes can be aggregated and divided by the number of attributes to obtain a coarse correlation number:

$$CORR(A_1,A_2,\ldots,A_n)=\Sigma CORR(A_i,A_j)/(^nC_2).$$

An additional measure of the correlation between the removed attributes and remaining attributes can also be used, while other correlation metrics could be used in place of functional dependency.

In accordance with at least one embodiment of the invention, another factor for interestingness is correlation with intended usage. Here, it is recognized that entity types should correspond to the intended usage of the discovered entities. The interaction of a user with the MDM system can thereby provide some clues regarding which attributes are useful for the user. User personae can be captured to account for different classes of users, e.g., an analyst exploiting data for his or her job, a data steward ensuring quality of stored data; the user persona can be obtained, e.g., by analyzing the server logs for different users.

In accordance with at least one embodiment of the invention, another factor for interestingness is obtained via exploiting the log of queries issued to the MDM server. Particularly, it can be recognized that each MDM query corresponds to a set of attributes that a user is selecting. Thus, a counter can be maintained for each set of attributes and, for each query in the log, the set of attributes that are selected is identified, wherein the counter is incremented for the corresponding set of attributes.

Thus, in accordance with at least one embodiment of the invention, it can be recognized that the interestingness of a set of attributes is proportional to the number of times that set of attributes is requested by the user. This is because the log indicates that the user is interested in that set of attributes as a group, and thus it becomes likely that it corresponds to a logical entity in the mind of the user. For example, if many applications need to work with "households", the number of queries that look for <Last Name, Home Phone, Language, Location> will be high.

In accordance with at least one embodiment of the invention, still another factor for interestingness is the number of attributes in the set. A larger number of attributes is preferable, since it is more likely to define meaningful entities. For example, just the attribute <First Name> is unlikely to be interesting as an entity. Yet another factor is average group size. Particularly, if a grouping is done of member records based on the attributes, there are obtained groups of records that form entities. Generally, smaller group sizes will be preferable, since very large group sizes would lead to large entities, which may not be of much interest. For example, the attributes <Country, Age> will lead to large groups, since there are possibly many people with the same age in a location (country); thus, this might not be considered to be an interesting attribute set. In the case of hierarchical entities, a small group size is expected at the root level of the hierarchy. For example, the number of people matching for <Age, Country> might be very large, compared to the number of people matching for <Age, City, State, Country>, making the latter a preferred choice for an interesting entity type. The expected group size will vary based on the level in the hierarchy.

In accordance with at least one embodiment of the invention, various measures for determining interestingness can be normalized and combined in different ways to give an overall score. For example, a weighted sum of these measures could be used. In some embodiments, the measures may not be combined and could actually be presented separately to the user for making a choice; in such an instance, the user can apply individual weights to different measures him/herself, at his/her own discretion.

Continuing, in accordance with at least one embodiment of the invention, in generating interesting entity types, the process starts with the entire set of attributes of the records. It generates all possible subsets of the attributes as potential attribute sets, or entity types. For n attributes, this leads to a lattice of $2^n$ subsets. For example, for the set <First Name, Last Name, Home Phone, Email, Age, Language, Location>, this process will generate all possible subsets of these attributes. In some embodiments, one can avoid generating some of these subsets if there is a lower bound on the number of attributes needed in an entity.

In accordance with at least one embodiment of the invention, in ranking the interesting entity types, for each attribute set, various interestingness measures are computed. Optionally, the measures are combined into an overall measure (e.g., by assigning weights to different measures and then combining them). If the measures are not combined, sets are ordered based on the combined measure or by using a skyline operator. In handling ontologies and dimension hierarchies, such ordering can be re-modeled in such a way as to include all attributes of the ontology or hierarchy into the attribute set. For example, if there is a hierarchy on the location attribute as City→State→Country, one can add all these attributes to get the set <First Name, Last Name, Home Phone, Email. Age, Language, City, State, Country> as the starting set.

In accordance with at least one alternative embodiment of the invention, to generate interesting attribute sets, each entity type can be associated with a set of attributes. The various attributes can then be visualized as graph of attributes, as exemplified by the attribute relation graph shown in FIG. 5. Here, there is a node for each attribute and an edge for correlation (or functional dependency) between the attributes. The relationship can be one-one (e.g., $A_2$-$A_{n-1}$) if the functional dependency is approximately equal to 1 in both the directions, or many-one (e.g., $A_1$-$A_3$), or many-many (e.g., $A_1$-$A_n$). An entity type can now be characterized as a directed path in this graph. The nodes with one-one relationships can be merged together, and the set of candidate paths can be significantly reduced by using two thresholds $t_1$ and $t_2$, such that, in the direction of the path, each edge has functional dependency above $t_1$ and in the direction opposite to the path, the dependency is below $t_2$. This ensures that the successive attributes in the path are highly correlated but also distinctive, and the resultant combinations can be ranked using methods such as those described herein.

In accordance with at least one embodiment of the invention, with respect to entity validation, as mentioned earlier, entity type discovery can be a semi-automatic process. As such, the system seeks user input to validate the entity types (attribute sets) discovered in the previous (discovery) step. The system presents the discovered attribute sets to the user in an order of preference (based on overall score or skyline) alongside the overall scores for the various interestingness measures. The attribute sets are related to each other by ancestor-descendent relationship according to the subset lattice. For example: <First Name, Last Name, Home Phone> would be a child of <Last Name, Home Phone>. Some sample entities of each type are also displayed. The user can then validate the following: whether the given set of attributes defining the entity type makes sense; and whether the hierarchy by itself is useful or interesting.

In accordance with at least one embodiment of the invention, for supplementary strategies to validate certain types of "interestingness", structural properties of the obtained hierarchy can be verified. Also, a verification can be made that the transition between levels of the hierarchy does not result in extremes of set cardinality. Optionally, the user can explicitly define the entity types of interest by specifying the attribute sets for each entity type.

With respect to hierarchical entity resolution, in accordance with at least one embodiment of the invention, an output of previous steps will produce a set of interesting entity types (attribute sets) arranged according to a lattice hierarchy. For each entity type, there can be invoked any standard entity resolution algorithm using only the attributes corresponding to that entity type. (By way of an illustrative and non-restrictive example, for background purposes, a suitable entity resolution algorithm may be found in Omar Benjelloun et al, "Swoosh: a generic approach to entity resolution," *The VLDB Journal*, (2008), 22 pages, Springer-Verlag. For example, for the Household entity type, entity resolution is invoked using only the following attributes: <Last Name, Home Phone, Language, Location>. This will result in sets of records grouped together into entities of that type.

In accordance with at least one embodiment of the invention, the entities at different levels in the lattice are linked into a "is-a" relationship. Particularly, e.g., an entity e1 is linked by "is-a" relationship to e2 if e1 is contained in e2, i.e., if the set of member records of e1 are contained (fuzzy containment—may not be completely contained) in the set of member records of e2. For example, a household entity will contain the person entities whose member records are contained in the household entity. The entities that map to the same higher level entity by "is-a" relationship are linked by a "sibling" relationship. For example, all "person" entities that map to the same "household" entity are siblings.

In accordance with at least one alternative embodiment of the present invention, rather than invoking the entity resolution separately for each entity type, further optimizations could be done. In a top-down approach, entity resolution at a lower level can be restricted to only members that map to the same higher level entity. For example, if "household" entities are determined first, the "person" level entity resolution needs to look at only records that map to the same household. There is no need to resolve persons across households.

By way of other advantages attained herein, in accordance with at least one embodiment of the invention, there is provided herein a manner of undertaking faceted search through a top-down mechanism, e.g., to search for entities based on location, a city, or region. There is also provided a new look at the ER process itself in the light of the hierarchies formed. It becomes possible to get good precision and recall, since there is refinement at every level down.

FIG. 6 provides a sample database, in accordance with at least one embodiment of the invention; for illustrative purposes, it can be considered an extension of the one provided in FIG. 2. Let it be assumed that, through entity discovery and validation using correlation and interestingness measures as described earlier, the following entity types are discovered as interesting: <First Name, Last Name, Home Phone, Email, Age, Language, Location>, i.e. all attributes (person); <Last Name, Home Phone, Language, Location> (household); <Location> (location).

In accordance with at least one embodiment of the invention, given the above, entity resolution at a "person" level, using its set of attributes, would provide the following groups: e1: <m1, m2>, e2: <m2, m3, m4>, e3: <m5, m6>, e4: <m7, m6>, e5: <m8, m6>. It can be noted that there are overlaps between the entities formed, and that the records within each entity are linked to each other.

In accordance with at least one embodiment of the invention, in the current illustrative example, entity resolution at "household" level will now provide: e6: <m1, m2, m3, m4>, e7: <m5, m6>, e8: <m6, m7, m8>. Another way to view the same formed entities would be: e6: <e1, e2>, e7: <e3>, e8: <e4, e5>. Links ("is-a") are established between the sub-entities and the super entity, e.g., between e1 and e6. Links ("sibling") are also established between the sub-entities themselves, e.g., between e1 and e2.

In accordance with at least one embodiment of the invention, in the current illustrative example, entity resolution at "location" will now provide: e9: <m1, m2, m3, m4>, e10: <m5, m6, m7, m8>. Effectively, e9: <e6> e10<e7, e8>. It can be seen that necessary links are established.

Figure 7:
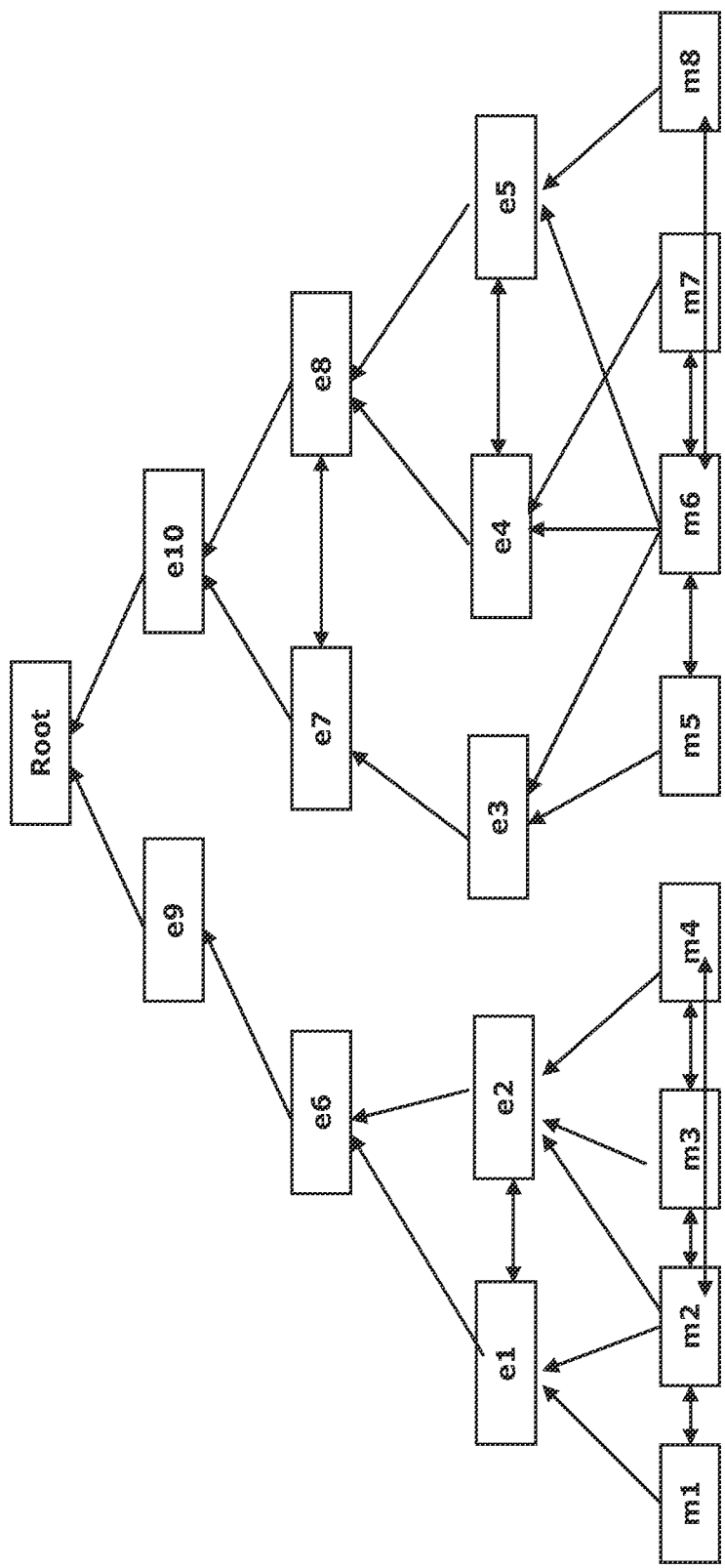
FIG. 7 provides a hierarchy tree.

In accordance with at least one embodiment of the invention, in the current illustrative example, the final tree view of the hierarchies would be as shown in FIG. 7.

Figure 8:
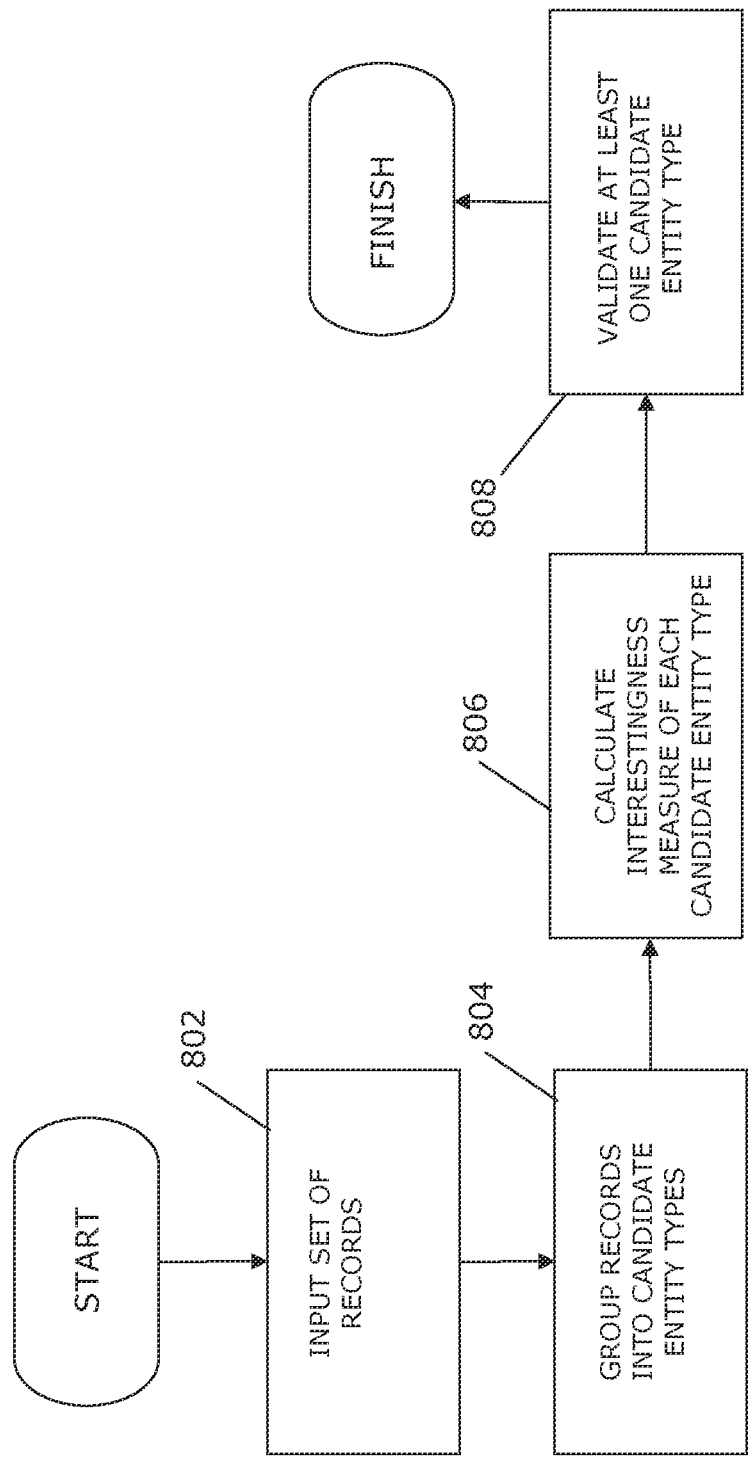
FIG. 8 sets forth a process more generally for discovering entity types for a set of records.

FIG. 8 sets forth a process more generally for discovering entity types for a set of records, in accordance with at least one embodiment of the invention. It should be appreciated that a process such as that broadly illustrated in FIG. 9 can be carried out on essentially any suitable computer system or set of computer systems, which may, by way of an illustrative and non-restrictive example, include a system such as that indicated at 12' in FIG. 9. In accordance with an example embodiment, most if not all of the process steps discussed with respect to FIG. 8 can be performed by way of a processing unit or units and system memory such as those indicated, respectively, at 16' and 28' in FIG. 9.

As shown in FIG. 8, a set of records is input, with each record comprising attributes with associated attribute values (802). The records are grouped into candidate entity types in view of at least one of: the attribute values of the records, at least one domain ontology and at least one dimension hierarchy (804). An interestingness measure of each candidate entity type is calculated, via estimating interestingness based on at least one factor selected from the group consisting of: a correlation between attribute values of records, a number of attributes, a log of queries issued to a server, and an average group size for candidate entity types (806). At least one candidate entity type is validated based on the calculated interestingness measures (808).

Figure 9:
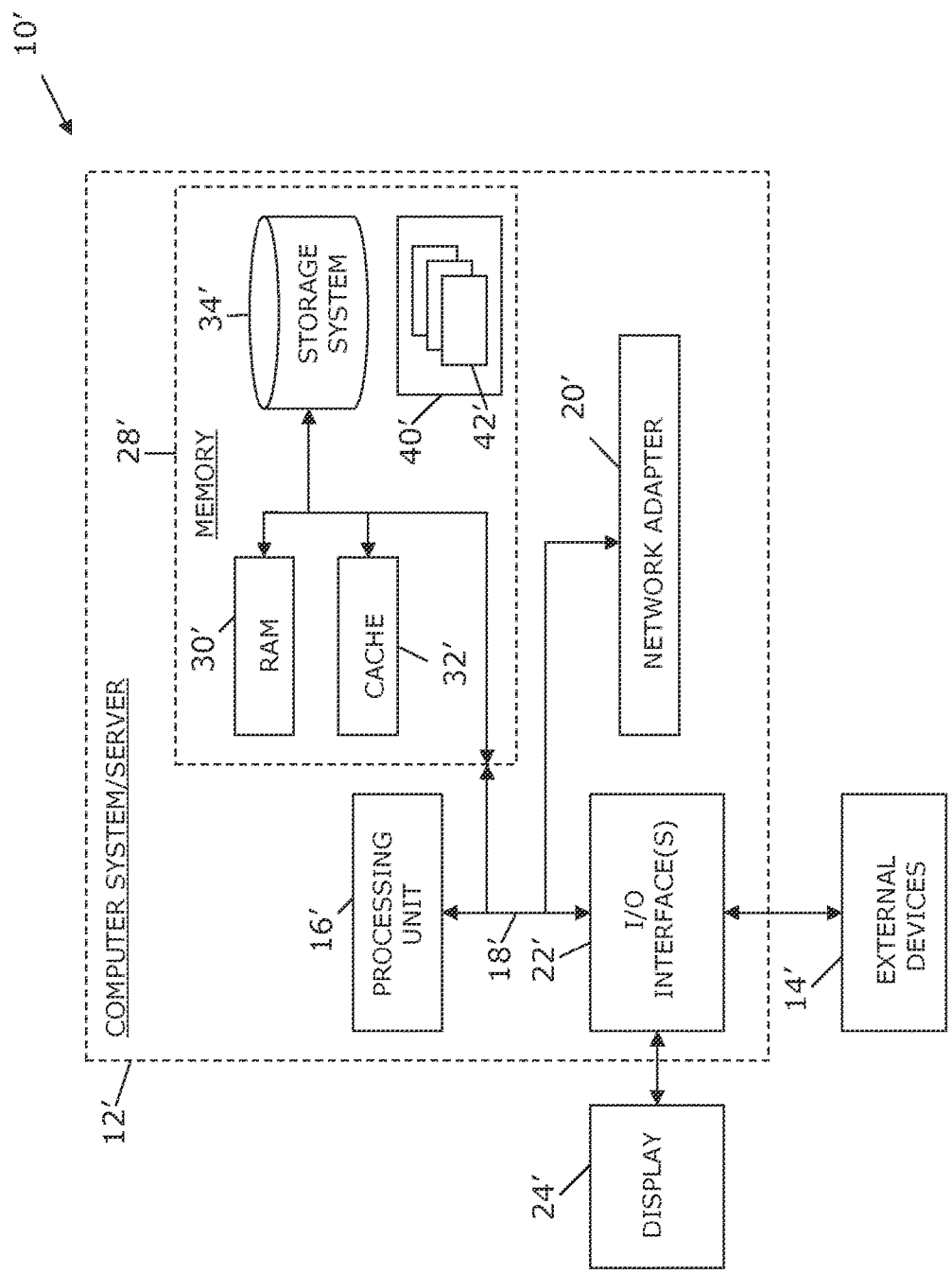
FIG. 9 illustrates a computer system.

Referring now to FIG. 9, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:
1. A method of discovering entity types for a set of records, said method comprising:
    inputting a set of records, each record comprising attributes with associated attribute values;
    grouping the records into candidate entity types in view of at least one of: the attribute values of the records, at least one domain ontology, and at least one dimension hierarchy, wherein the grouping comprises constructing a lattice space of attribute combinations and wherein the candidate entity types are based upon one or more of the attribute combinations;
    calculating an interestingness measure of each candidate entity type being associated with one or more of the attribute combinations, wherein the interestingness measure comprises a measure of relevance of a candidate entity type and wherein the calculating comprises estimating interestingness of the one or more attribute combinations associated with the candidate entity type based on a correlation between attribute values of records and attributing the interestingness of the one or more attribute combination associated with the candidate entity type to the candidate entity type;
    the correlation being identified by calculating a correlation score between a pair of attributes of an attribute combination of the candidate entity type, wherein the correlation score is based upon functional dependency between the pair of attributes and an intended usage of the candidate entity type;

ranking the candidate entity types based upon the interestingness measure attributed to each candidate entity types;

validating, by ranked order, at least one of the candidate entity types based on the calculated interestingness measures; and grouping, using the validated candidate entity types, attributes of entities within the set of records into entity types identified by the validated candidate entity types.

2. The method according to claim 1, wherein:

said validating comprises assisting a user in validating at least one candidate entity type; and assisting a user in creating at least one new candidate entity type.

3. The method according to claim 2, wherein said validating comprises determining a relevance of each candidate entity type to at least one preconfigured entity type and presenting the candidate entity types to the user in an order of relevance.

4. The method according to claim 2, wherein said calculating comprises:

employing a plurality of individual measures to determine interestingness;

assigning relative weights to the individual measures; and combining the weighted individual measures.

5. The method according to claim 1, comprising establishing relationships between a plurality of candidate entity types.

6. The method according to claim 5, wherein said establishing of relationships comprises linking discovered entity types via discovering an is-a relationship.

7. The method according to claim 6, wherein said establishing of relationships comprises linking discovered entity types additionally via discovering one or more sibling relationships.

8. The method according to claim 1, wherein said grouping comprises consulting all of: the attribute values of the records, domain ontologies and dimension hierarchies.

9. The method according to claim 8, wherein said grouping comprises identifying candidate entity types at one or more hierarchy levels via using attributes relevant to each candidate entity type.

10. An apparatus for discovering entity types for a set of records, said apparatus comprising:

at least one hardware processor; and a computer readable storage medium having computer readable program code embodied therewith and executable by the at least one processor, the computer readable program code comprising:

computer readable program code configured to input a set of records, each record comprising attributes with associated attribute values;

computer readable program code configured to group the records into candidate entity types in view of at least one of: the attribute values of the records, at least one domain ontology and at least one dimension hierarchy, wherein the grouping comprises constructing a lattice space of attribute combinations and wherein the candidate entity types are based upon one or more of the attribute combinations;

computer readable program code configured to calculate an interestingness measure of each candidate entity type being associated with one or more of the attribute combinations, wherein the interestingness measure comprises a measure of relevance of a candidate entity type and wherein the calculating comprises estimating interestingness of the one or more attribute combinations associated with the candidate entity type based on a correlation between attribute values of records and attributing the interestingness of the one or more attribute combination associated with the candidate entity type to the candidate entity type;

the correlation being identified by calculating a correlation score between a pair of attributes of an attribute combination of the candidate entity type, wherein the correlation score is based upon functional dependency between the pair of attributes and an intended usage of the candidate entity type;

computer readable program code configured to rank the candidate entity types based upon the interestingness measure attributed to each candidate entity types;

computer readable program code configured to validate, by ranked order, at least one of the candidate entity type based on the calculated interestingness measures; and computer readable program code configured to group, using the validated candidate entity types, attributes of entities within the set of records into entity types identified by the validated candidate entity types.

11. A computer program product for discovering entity types for a set of records, said computer program product comprising:

a computer readable storage medium having computer readable program code embodied therewith, the computer readable program code comprising:

computer readable program code configured to input a set of records, each record comprising attributes with associated attribute values;

computer readable program code configured to group the records into candidate entity types in view of at least one of: the attribute values of the records, at least one domain ontology and at least one dimension hierarchy, wherein the grouping comprises constructing a lattice space of attribute combinations and wherein the candidate entity types are based upon one or more of the attribute combinations;

computer readable program code configured to calculate an interestingness measure of each candidate entity type being associated with one or more of the attribute combinations, wherein the interestingness measure comprises a measure of relevance of a candidate entity type and wherein the calculating comprises estimating interestingness of the one or more attribute combinations associated with the candidate entity type based on a correlation between attribute values of records and attributing the interestingness of the one or more attribute combination associated with the candidate entity type to the candidate entity type;

the correlation being identified by calculating a correlation score between a pair of attributes of an attribute combination of the candidate entity type, wherein the correlation score is based upon functional dependency between the pair of attributes and an intended usage of the candidate entity type;

computer readable program code configured to rank the candidate entity types based upon the interestingness measure attributed to each candidate entity types;

computer readable program code configured to validate, by ranked order, at least one of the candidate entity type based on the calculated interestingness measures; and computer readable program code configured to group, using the validated candidate entity types, attributes of entities within the set of records into entity types identified by the validated candidate entity types.

12. The computer program product according to claim 11, wherein said computer readable program code is configured to:
   assist a user in validating at least one candidate entity type; and
   assist a user in creating at least one new candidate entity type.

13. The computer program product according to claim 12, wherein said computer readable program code is configured to determine a relevance of each candidate entity type to at least one preconfigured entity type and present the candidate entity types to the user in an order of relevance.

14. The computer program product according to claim 12, wherein said computer readable program code is configured to:
   employ a plurality of individual measures to determine interestingness;
   assign relative weights to the individual measures; and
   combine the weighted individual measures.

15. The computer program product according to claim 11, wherein said computer readable program code is configured to establish relationships between a plurality of candidate entity types.

16. The computer program product according to claim 15, wherein said computer readable program code is configured to link discovered entity types via discovering an is-a relationship.

17. The computer program product according to claim 16, wherein said computer readable program code is configured to link discovered entity types additionally via discovering one or more sibling relationships.

18. The computer program product according to claim 11, wherein said computer readable program code is configured to group in view of all of: the attribute values of the records, domain ontologies and dimension hierarchies.

19. The computer program product according to claim 18, wherein said grouping comprises identifying candidate entity types at one or more hierarchy levels via using attributes relevant to each candidate entity type.

20. A method comprising:
obtaining a set of records; and
semi-automatically discovering entity types relative to the set of records via:
   obtaining attributes, domain ontologies, and dimension hierarchies with respect to the records, wherein the obtaining comprises constructing a lattice space of attribute combinations and wherein the candidate entity types are based upon one or more of the attribute combinations;
estimating a quantitative interestingness score of candidate entity types being associated with one or more of the attribute combinations, wherein the interestingness measure comprises a measure of relevance of a candidate entity type and wherein the estimating comprises estimating an interestingness of the one or more attribute combinations associated with the candidate entity type based on correlations between attributes and attributing the interestingness of the one or more attribute combination associated with the candidate entity type to the candidate entity type;
the correlations being identified by calculating a correlation score between a pair of attributes of an attribute combination of the candidate entity type, wherein the correlation score is based upon functional dependency between the pair of attributes and an intended usage of the candidate entity type;
ranking the candidate entity types based upon the interestingness measure attributed to each candidate entity types;
assisting a user in validating candidate entity types and creating new candidate entity types via presenting the candidate entity types in the ranked order of relevance along with corresponding interestingness scores and sample entities of each of the candidate entity types; and
grouping, using the validated candidate entity types, attributes of entities within the set of records into entity types identified by the validated candidate entity types.

* * * * *